United States Patent [19]

Wright et al.

[11] Patent Number: 5,209,967
[45] Date of Patent: May 11, 1993

[54] PRESSURE SENSITIVE MEMBRANE AND METHOD THEREFOR

[75] Inventors: Robin E. Wright, Inver Grove Heights; William V. Balsimo, Afton, both of Minn.

[73] Assignee: Minnesota Mining and Manufacturing Company, St. Paul, Minn.

[21] Appl. No.: 828,513

[22] Filed: Jan. 31, 1992

[51] Int. Cl.$^5$ .......................... B32B 27/02; B32B 5/16
[52] U.S. Cl. .................................. 428/283; 200/512; 428/317.9; 428/338; 428/422
[58] Field of Search ............... 428/283, 317.9, 338, 428/422; 200/512

[56] References Cited

U.S. PATENT DOCUMENTS

| | | | |
|---|---|---|---|
| 3,953,566 | 4/1976 | Gore | 264/288 |
| 3,962,153 | 6/1976 | Gore | 260/2.5 R |
| 4,096,227 | 6/1978 | Gore | 264/210 R |
| 4,098,945 | 7/1978 | Oehmke | 428/327 |
| 4,153,661 | 5/1979 | Ree et al. | 264/120 |
| 4,187,390 | 2/1980 | Gore | 174/102 R |
| 4,199,628 | 4/1980 | Caines | 428/36 |
| 4,208,194 | 6/1980 | Nelson | 55/158 |
| 4,265,952 | 5/1981 | Caines | 428/36 |
| 4,373,519 | 2/1983 | Errede et al. | 128/156 |
| 4,460,642 | 7/1984 | Errede et al. | 428/283 |
| 4,483,889 | 11/1984 | Andersson | 427/389.9 |
| 4,565,663 | 1/1986 | Errede et al. | 264/120 |
| 4,624,798 | 11/1986 | Gindrup et al. | 252/62.54 |
| 4,722,898 | 2/1988 | Errede et al. | 435/182 |
| 4,810,381 | 3/1989 | Hagen et al. | 210/502.1 |
| 4,871,671 | 10/1989 | Errede et al. | 435/182 |
| 4,902,747 | 2/1990 | Kassal et al. | 525/151 |
| 4,906,378 | 3/1990 | Hagen et al. | 210/635 |
| 4,914,156 | 4/1990 | Howe | 525/166 |
| 4,923,737 | 5/1990 | De La Torre | 428/217 |
| 4,945,125 | 7/1990 | Dillon et al. | 527/427 |
| 4,962,136 | 10/1990 | Peters | 523/220 |
| 4,966,941 | 10/1990 | Subramanian | 525/66 |
| 4,971,697 | 11/1990 | Douden et al. | 210/502.1 |
| 4,971,736 | 11/1990 | Hagen et al. | 264/22 |
| 4,985,296 | 1/1991 | Mortimer, Jr. | 428/220 |
| 4,990,544 | 2/1991 | Asaumi et al. | 521/145 |
| 5,019,232 | 5/1991 | Wilson et al. | 204/182.8 |
| 5,071,610 | 12/1991 | Hagen et al. | 264/120 |

*Primary Examiner*—William J. Van Balen
*Attorney, Agent, or Firm*—Gary L. Griswold; Walter N. Kirn; Lorraine R. Sherman

[57] ABSTRACT

An electrically nonconductive composite article comprising a fibrillated polytetrafluoroethylene (PTFE) matrix, electrically conductive particles, and electrically nonconductive, energy expanded polymeric particles, which composite upon application of pressure thereto becomes electrically conductive and allows for the flow of electricity through the article. The articles are thin and can be used as a pressure sensitive pad or an interconnect for an electronic component.

21 Claims, No Drawings

PRESSURE SENSITIVE MEMBRANE AND METHOD THEREFOR

TECHNICAL FIELD OF THE INVENTION

This invention relates to a pressure sensitive membrane and a method therefor, the membrane comprising a polytetrafluoroethylene (PTFE) fibril matrix having both conductive particles and energy expanded particles enmeshed therein.

BACKGROUND OF THE INVENTION

Expanded polytetrafluoroethylene-containing articles are known to provide thermal insulation. Related U.S. Pat. Nos. 3,953,566, 3,962,153, 4,096,227, and 4,187,390 teach a porous product comprising expanded, amorphous locked PTFE which can be laminated and impregnated to provide shaped articles. The more highly expanded materials of that invention are disclosed to be useful, for example, as thermal insulators and shaped articles.

PTFE fibrillated matrices are known. The background art teaches several formulations for blending an aqueous PTFE dispersion with various additives and/or adjuvants designed for specific purposes. For example, U.S. Pat. No. 4,990,544 teaches a gasket comprising a fibrillated PTFE resin and dispersed therein a fine inorganic powder. U.S. Pat. No. 4,985,296 teaches an expanded, porous PTFE film containing filler material which is purposely compressed to provide thin films where space reduction is desirable.

U.S. Pat. Nos. 4,971,736, 4,906,378, and 4,810,381 disclose a chromatographic sheetlike article and method of preparing a composite chromatographic sheetlike article comprising a PTFE fibril matrix and nonswellable sorptive hydrophobic particles enmeshed in the matrix. References cited in these patents relate to other PTFE matrices containing particulates, including U.S. Pat. Nos. 4,153,661, 4,373,519, 4,460,642, and 4,565,663.

It is known that metals can be incorporated in fibrillated PTFE, as in, for example, U.S. Pat. No. 4,153,661. U.S. Pat. No. 4,923,737 discloses a method for a "metal cloth" prepared from fibrillated PTFE containing metal or other particles entrapped in the fibrils.

A composition comprising fibrillated PTFE in combination with a polyamide has been disclosed to provide articles by extrusion blowmolding as in U.S. Pat. No. 4,966,941, and with molybdenum disulfide and optionally an elastomer to provide articles with increased durability as in U.S. Pat. No. 4,962,136.

U.S. Pat. No. 4,945,125 teaches a process of producing a fibrillated semi-interpenetrating polymer network of PTFE and silicone elastomer. U.S. Pat. No. 4,914,156 describes a blow moldable composition comprising a polyether, an epoxide polymer, a source of catalytic cations, and a fibrillatable PTFE. U.S. Pat. No. 4,902,747 discloses a blow moldable polyarylate composition containing fibrillatable PTFE.

Vermicular expanded graphite has been incorporated into PTFE. U.S. Pat. Nos. 4,265,952 and 4,199,628 relate to a vermicular expanded graphite composite blended with a corrosion resistant resin such as PTFE with improved impermeability to corrosive fluids at high temperatures.

Conductive compositions comprising a polymeric binder system having dispersed therein electrically conductive particles and deformable non-conductive spherical domains have been disclosed, for example, in U.S. Pat. No. 4,098,945.

U.S. Pat. No. 4,483,889 teaches a method for making a foam composite material comprising a fibrous matrix, expandable polymeric microspheres, and a formaldehyde-type resin.

U.S. Pat. No. 4,624,798 describes the use of silver coated glass bubbles in a silicone material at a loading percent just below that needed to obtain bulk conductivity in the composite. When external pressure is applied to a surface, the composite becomes conductive.

SUMMARY OF THE INVENTION

Briefly, the present invention provides a composite article comprising a polytetrafluoroethylene (PTFE) fibril matrix having enmeshed therein (a) electrically conductive particles, and (b) electrically nonconductive, energy expanded hollow polymeric particles.

Preferably, the weight ratio of conductive particles to nonconductive, energy expanded hollow polymeric particles is in the range of about 999:1 to about 3:1. The total amount of particulates to fibril matrix is preferably from about 98:2 to about 75:25 by weight.

In a preferred embodiment, the article of this invention can be placed between two conductive surfaces, such as metal plates, and can serve as a reversible electrical circuit making element (switch) when an electrical current is provided, such as from a DC power supply. Flow of current is inhibited by the large bulk resistance of the composite. When pressure is applied to one of the conductive plates, however, such that the composite article is compressed, the resistance within the composite drops by several orders of magnitude, thereby allowing for the flow of electrical current through the circuit. When the applied force is removed, the bulk resistance of the composite membrane increases and current ceases to flow.

In another embodiment, pressure can be applied to the article of the invention at more than one location on the article's surface to provide either essentially linear or three-dimensional paths, e.g., line, cylinder, cone, parallelepiped, of electrical conductivity which act independently of each other due to the high internal resistance of the article in its bulk state. Thus, the article can provide simultaneous electrical contact to a multitude of pairs of electrical conductors, each pair operating as in the first embodiment, while maintaining the electrical integrity of each pair, or multiple contacts to a single conductor.

The composite article is prepared by a method including the steps of admixing conductive particles, nonconductive energy expandable hollow polymeric particles, and a PTFE dispersion to achieve a mass having a doughlike consistency, and calendering the doughlike mass between rollers set at successively narrower gaps at a temperature below the temperature of expansion of the nonconductive energy expandable particles for a number of passes necessary to achieve a sheetlike article having a thickness in the range of about 0.010 cm to 0.32 cm. The article is then heated at a suitable temperature and for a time sufficient to cause expansion of the nonconductive energy expandable hollow polymeric microspheres.

The microporous composite sheet-like article, a chamois-like material, is very conformable yet tough enough to provide some protection against the abrasive and penetrating effects of foreign objects. It maintains its physical integrity under normal handling conditions.

Assignee's copending application, U.S. Ser. No. 07/723,064 discloses a composite article comprising a fibrillated polyolefin matrix having either an energy expandable or an energy expanded hollow polymeric particulate enmeshed therein, the article being useful as a thermal insulator. Also, assignee's copending application, U.S. Ser. No. 07/722,665, discloses a sheetlike article comprising a fibrillated polytetrafluoroethylene matrix having either an energy expandable or an energy expanded hollow polymeric particulate and a sorptive particulate enmeshed therein, the composite sheetlike articles having controlled interstitial porosity and being useful in the separation and purification sciences. Additionally, assignee's copending application, U.S. Ser. No. 07/829,764, filed the same date as this application, discloses a composite article comprising PTFE having enmeshed therein conductive particles and energy expandable hollow polymeric particles. The article is conductive in bulk and is useful as a temperature sensitive circuit breaking element.

DETAILED DESCRIPTION OF THE PREFERRED EMBODIMENTS

In a preferred embodiment, this invention provides a composite membrane, or sheetlike article, which can be used as a pressure sensitive pad. The pressure sensitive element of the present invention is nonconductive, i.e., electrical current will not flow through the composite article due to its high internal resistance. When an external pressure is applied to a surface of the membrane, as by finger tip pressure, the resistance drops and allows for the flow of electrical current. Removal of the force causes the membrane to return to its insulating, or nonconductive, form and the current flow ceases.

In a second embodiment, the membrane can be used as a means for making electrical contact between a multitude of pairs of conductors in which each pair is, in effect, a miniature version of the first embodiment. The pressure sensitive element of the invention has a high internal resistance. The article can be used, for example, to provide simultaneous electrical contact between the electrical leads from a computer chip to a test device assembly in which the leads from the chip are in registry with electrical contacts on the test device. When pressure is applied to the assembly such that the membrane is selectively compressed in those areas containing an electrical lead, electrical continuity with the test device is established between the individual leads and their corresponding contact on the test device.

Electrically conductive particulate is present as the major component (preferably greater than 50 weight percent) of the precursor composite membrane (i.e., the composite membrane prior to expansion of the energy expandable particulate) in a fibrillated PTFE matrix. Electrically nonconductive, energy expandable hollow polymeric particulate, referred to as expandable particulate or expandable particles, is present as a minor component (preferably less than 50 weight percent) in the fibrillated PTFE matrix. The precursor composite membrane is preferably electrically conductive, although it need not be. Upon exposure to heat, the electrically nonconductive, energy expandable particulate is caused to expand. Resistivity of the composite membrane of the invention (i.e., the composite membrane after expansion of the energy expandable particulate) increases to greater than about $10^5$ ohm-cm, preferably greater than $10^6$ ohm-cm, and most preferably greater than $10^7$ ohm-cm.

Electrically conductive particulate enmeshed within the fibrillated PTFE matrix, or network, is the major component of the composite and can be any conductive particulate such as carbon, metal powder, metal bead, metal fiber, or metal flake, or it can be a metal coated particulate such as metal coated glass bubbles, metal coated glass beads, or metal coated mica flakes. Preferred metal coatings include silver, nickel, copper, gold, and tungsten. Carbon coated particles are also useful. Such coatings can be continuous or discontinuous. When continuous coatings are present, their thicknesses can be more than zero and up to 10 micrometers or more. Additionally, a combination of two or more conductive particulates can be used.

Size of the conductive particulate can be from about 0.1 micrometer to about 600 micrometers, preferably from 0.5 micrometer to 200 micrometers, and most preferably from 1 micrometer to 100 micrometers. Powder resistivity of the conductive particulate should be less than about 10 ohm-cm, preferably less than 1 ohm-cm, and most preferably less than $10^{-1}$ ohm-cm. Where metal powders are used, the powder resistivity can be as low as about $10^{-6}$ ohm-cm.

Examples of conductive particulate useful in the present invention include copper powder, 10 micrometer (Alfa Products, Ward Hill, Mass.); silver coated nickel flake, −200 mesh (Alfa Products); silver coated hollow glass bubbles, solid glass beads, and mica flake (Potter Industries, Inc., Parsippany, N.J.); and carbon powders (Aldrich Chemical Co., Milwaukee, Wis.).

Weight of conductive particulate to total weight of the composite membrane of the invention should be in the range from about 98% to about 25%, preferably from 96% to 40%, and more preferably from 95% to 50%.

Electrically nonconductive, energy expandable particulate is present as a minor component within the fibrillated PTFE network of the precursor composite membrane and is typically a polymeric bubble. Expandable particulate useful in the present invention precursor composite exhibits intumescence upon application of heat. The expandable particulate can be swellable or nonswellable in aqueous or organic liquid, and preferably is substantially insoluble in water or organic liquids used in preparation of the precursor composite membranes. In addition, the expandable particulate is not homogeneous, i.e., it is not a polymeric bead but rather comprises a polymeric shell having a central core comprised of a fluid, preferably liquid, material. A further characteristic is that the overall dimensions of the expandable particulate increase upon heating at a specific temperature. This expansion or intumescence is different from expansion due to solvent swelling and can occur in the solid state (i.e., in the absence of solvent). Additionally, the expandable particulate is preferably electrically nonconductive, i.e., the powder resistivity of the energy expandable particulate should be greater than about $10^4$ ohm-cm, preferably greater than $10^5$ ohm-cm, and most preferably greater than $10^6$ ohm-cm.

Expandable hollow polymeric particulate useful in the precursor composite includes those materials comprised of a polymeric shell and a core of at least one other material, either liquid or gaseous, most preferably a liquid at room temperature, in which the polymeric shell is essentially insoluble. A liquid core is advantageous because the degree of expansion is directly related to the volume change of the core material at the expansion temperature. For a gaseous core material, the volume expansion expected can be approximated from the general gas laws. However, expandable particulate comprising a liquid core material offers the opportunity to provide much larger volume changes, especially in those cases where a phase change takes place, i.e., the liquid volatilizes at or near the expansion temperature. Gaseous core materials include air and nonreactive gases and liquid core materials include organic liquids.

Preferred expandable polymeric particulate (also called microspheres, microballoons, and microbubbles) useful in the precursor composite can have shells comprising copolymers such as vinyl chloride and vinylidene chloride, copolymers of vinyl chloride and acrylonitrile, copolymers of vinylidene chloride and acrylonitrile, copolymers of methacrylonitrile and acrylonitrile, and copolymers of styrene and acrylonitrile. Further can be mentioned copolymers of methyl methacrylate containing up to about 20 percent by weight of styrene, copolymers of methyl methacrylate and up to about 50 percent by weight of ethyl methacrylate, and copolymers of methyl methacrylate and up to about 70 percent by weight of orthochlorostyrene. The unexpanded microspheres contain fluid, preferably volatile liquid, i.e., a blowing agent, which is conventional for microspheres of the type described here.. Suitably, the blowing agent is 5 to 30 percent by weight of the microsphere. The microspheres can be added in different manners, as dried particles, wet cakes, or in a suspension, e.g. in an alcohol such as isopropanol.

Unexpanded particulate desirably is in the size range of from about 0.1 micrometer to about 600 micrometers, preferably from 0.5 micrometer to 200 micrometers, most preferably from 1 micrometer to 100 micrometers. Expanded particulate can have a size in the range of from about 0.12 micrometer to 1000 micrometers, preferably from 1 micrometer to 600 micrometers. After expansion, the volume of the expandable particulate increases by a factor of at least 1.5, preferably a factor of at least 5, and most preferably a factor of at least 10, and may even be as high as a factor of about 100.

As an example, Expancel ™ polymeric microspheres (Nobel Industries, Sundsvall, Sweden) expand from an approximate diameter of 10 micrometers in the unexpanded form to an approximate diameter of 40 micrometers after expansion. The corresponding volume increase is $$V_f/V_i = (r_f/r_i)^3 = 4^3,$$

or 64-fold, where $V_f$ and $r_f$ are the final volume and radius of the expandable particulate, respectively, after expansion, and $V_i$ and $r_i$ are the corresponding initial values for the unexpanded particulate.

Nobel Industries provides a series of expandable bubbles which expand at different temperatures. Examples of commercially available expandable hollow polymeric microspheres useful in the present invention precursor composite include those made of poly(vinylidene chloride-coacrylonitrile) such as Expancel ™ 820, Expancel ™ 642, Expancel ™ 551, Expancel ™ 461, and Expancel ™ 051 polymeric microspheres. Other commercially available materials having similar constructions and comprising, for example, a shell of poly(methacrylonitrile-co-acrylonitrile), available as Micropearl ™ F-80K microbubbles (Matsumoto Yushi-Seiyaku Co., Ltd., Japan) and Expancel ™ 091 polymeric microspheres, are also useful as expandable particulate in the present invention.

A wide variety of blowing or raising agents may be enclosed within the polymeric shell of the expandable microspheres. They can be volatile fluid-forming agents such as aliphatic hydrocarbons including ethane, ethylene, propane, propene, butane, isobutane, isopentane, neopentane, acetylene, hexane, heptane, or mixtures of one or more such aliphatic hydrocarbons preferably having a number average molecular weight of at least 26 and a boiling point at atmospheric pressure about the same temperature range or below the range of the softening point of the resinous material of the polymeric shell when saturated with the particular blowing agent utilized.

Other suitable fluid-forming agents are halocarbons such as fluorotrichloromethane, perfluorobutanes, perfluoropentanes, perfluorohexanes, perfluoroheptanes, dichlorodifluoromethane, chlorotrifluoromethane, trichlorotrifluoroethane, heptafluorochlorocyclobutane, and hexafluorodichlorocyclobutane, and tetraalkyl silanes such as tetramethyl silane, trimethylethyl silane, trimethylisopropyl silane, and trimethyl-n-propyl silane, all of which are commercially available. Further discussion of blowing agents in general can be found in U.S. Pat. Nos. 4,640,933 and 4,694,027, which patents are incorporated herein by reference.

Preparation of expandable particulate is normally accomplished by suspension polymerization. A general description of some of the techniques that can be employed and a detailed description of various compositions that are useful as expandable particulate can be found in U.S. Pat. No. 3,615,972. A further description of compositions useful as expandable particulate in the present invention is given in U.S. Pat. No. 4,483,889. Both patents are incorporated herein by reference.

Shape of the expandable particulate is preferably spherical but is not restricted to spherical, i.e., it may be irregular. Other shapes can easily be envisioned such as urnlike as described in U.S. Pat. No. 3,615,972. Shape and orientation of the expandable particulate in the precursor composite membrane determine the anisotropy of the expansion step. Where essentially spherical particles are used, heating leads to isotropic expansion of the composite, i.e., expansion is uniform in all three directions, so that the overall shape of the membrane does not change, only its size. Other physical constraints that may have been imposed on the membrane, such as during processing or by anchoring one part of the membrane prior to expansion, may lead to less than perfect isotropic expansion where essentially spherical expandable particulate is used.

The PTFE aqueous dispersion employed in producing the PTFE precursor composite sheets of this invention is a milky-white aqueous suspension of PTFE particles. Typically, the PTFE aqueous dispersion will contain about 20% to about 70% by weight solids, the major portion of such solids being PTFE particles having a particle size in the range of from about 0.05 micrometer to about 5.0 micrometers. PTFE aqueous dispersions useful in the present invention may contain other ingredients, for example, surfactant materials and stabilizers which promote continued suspension of the PTFE particles.

Such PTFE aqueous dispersions are presently commercially available from E.I. Dupont de Nemours (Wilmington, Del.), for example, under the tradenames Teflon ™ 30, Teflon ™ 30B, or Teflon ™ 42. Teflon 30 and 30B contain about 59% to about 61% solids by weight which are for the most part 0.05 micrometer to 5.0 micrometer PTFE particles and from about 5.5% to about 6.5% by weight (based on weight of PTFE resin) of non-ionic wetting agent, typically octylphenol polyoxyethylene or nonylphenol polyoxyethylene. Teflon 42 contains about 32% to 35% by weight solids and no wetting agent. Fluon ™ PTFE, having reduced surfactant levels, is available from ICI, Exton, Pa.

Precursor composite articles of the invention can be provided by the method described in any of U.S. Pat. Nos. 5,071,610, 4,971,736, 4,906,378, 4,810,381, and 4,153,661 which are incorporated herein by reference. In all cases, processing takes place below the temperature for expansion of the expandable particulate. This processing temperature preferably is room temperature.

Thickness of the precursor composite membrane can range from about 0.010 cm to about 0.32 cm, preferably from 0.012 cm to 0.25 cm. When the membrane is too thin, it has very little structural integrity while membranes having thicknesses outside of the given range may be difficult to form. Thinner membranes can be made by densification as is described in U.S. Pat. No. 4,985,286. When thinner membranes are desired, it is advantageous to avoid using metal coated glass bubbles or other fairly fragile supports in order to avoid possible breakage which may occur under pressures applied during formation of the fibrillated PTFE network.

Upon heating the precursor composite membrane, thickness of the membrane increases due to the expansion of the expandable particulate. The amount of expansion observed is dependent on several factors, including the weight percent of expandable particulate present in the membrane, the type of expandable particulate, the molecular weight of the polymeric shell of the expandable particulate, and the toughness of the fibrillated PTFE matrix holding the precursor composite together. A small dimensional increase, i.e., in the range of 0.5 to 10 percent is usually sufficient to change the electrical properties of the membrane from a conducting to an insulating state. Typical thickness of the membranes of the invention can be in the range of from about 0.010 cm to about 1.5 cm, preferably from 0.015 cm to 0.5 cm.

Although not wishing to be bound by theory, Applicants note this observation is consistent with a mechanism based on conventional percolation theory in which the membrane has associated with it a critical volume fraction of conductive particles. When the volume fraction of conductive particles is below this value, the membrane has a high resistance. Application of pressure to some area of the surface of the membrane results in a localized decrease in the membrane volume. Since the volume of conductive particles in this compressed volume is essentially constant, the volume fraction of conductive particles increases. When the volume fraction of conductive particles is less than the critical volume fraction in the absence of an external pressure and greater than the critical volume fraction under pressure, the membrane transforms from an insulating state to a conductive one.

Temperatures needed for the thermal expansion step to occur are dependent on the type of polymer comprising the shell of the microbubble and on the particular blowing agent used. Typical temperatures range from about 40° C. to about 220° C., preferably from 60° C. to 200° C., most preferably from 80° C. to 190° C.

Optionally, other components or adjuvants can be added to the composite membrane to impart some added functionality such as color or strength to the final composite. When present, adjuvants can be included in an amount from about 0.01% to about 50% by weight, preferably from 0.1% to 40%, and most preferably from 0.5% to 25%, based on the total weight of the composite. As with expandable particulate, additional components can be swellable or nonswellable in aqueous or organic liquid, and preferably are substantially insoluble in water or organic liquids.

Optional adjuvants can be in the size range of from about 0.1 micrometer to about 600 micrometers, preferably from 0.5 micrometer to 200 micrometers, most preferably from 1 micrometer to 100 micrometers. This size range is desirable in order to obtain the best physical properties such as toughness and uniformity for the resulting membrane.

It is important that the fibrillated network of the precursor composite membrane be tight enough to support the enmeshment of the conductive particulate and the expandable particulate so that the final composite has sufficient structural integrity to be handled. In the present invention, the conductive particulate and the expandable particulate do not easily dislodge from the final composite, i.e., they do not fall out of the membrane when the membrane is handled. A further advantage of a PTFE fibrillated network is that the PTFE fibrils are able to flow or draw out as the expandable particulate expands, thereby maintaining the structural integrity of the membrane. In addition, the poor chemical bonding of PTFE to the expandable particulate also allows the fibrils to 'slide' from a given microbubble's surface during the expansion step, i.e., there is poor adhesion of the fibrils to the polymeric shell of the microbubbles. The useful range of fibrillated polymer in the final composites can be from about 2% to about 25% by weight, preferably from 3% to 23%, and most preferably from 5% to 20%, based on the total weight of the composite.

Articles of the invention are useful as an on/off switch for electrical devices, as an interconnect for electronic components, as a means of providing input, for example, to a telephone dialing system, as a control for touch sensitive logic systems, as a pressure transducer, or as a pressure sensitive pad.

Objects and advantages of this invention are further illustrated by the following examples, but the particular materials and amounts thereof recited in these examples, as well as other conditions and details, should not be construed to unduly limit this invention.

EXAMPLES

Example 1

This example describes the preparation of a fibrillated PTFE polymer network in which a conductive particulate and a nonconductive, energy expanded particulate are enmeshed. The article has use as a pressure sensitive pad.

Twenty four grams of Conduct-o-Fil ™ S3000-S silver coated glass beads (Potter Industries, Inc., Parsippany, N.J.) were mixed with 1.0 gram of Expancel 551DU hollow polymeric microbubbles (Nobel Industries). To this was added a PTFE dispersion prepared by adding 10 grams of a 50% by volume solution of i-propanol in water to 4.71 grams Teflon 30B aqueous dispersion (62% solids) (E.I. Dupont de Nemours, Inc.)

to give a mixture containing 86% bead, 3.6% expandable particulate, and 10.4% PTFE. The ingredients were hand mixed with a spatula until they had become doughlike in consistency. The mixture was then passed at room temperature (23° C.) through a two roll mill set at an initial gap of approximately 0.3 cm for a total of ten passes, folding the product and turning 90° prior to each successive pass. This gave a tough web which was then passed through the mill without folding for an additional six passes, decreasing the gap slightly for each pass. The product after the last pass had a thickness of 0.03 cm. The resulting thin sheet was then heated in an oven at 120° C. for 3 minutes, causing the thickness to increase slightly. The bulk resistivity was greater than $10^7$ ohm-cm.

Example 2

This example describes the application of the article of Example 1 in a pressure sensitive switch.

A 0.56 cm diameter disc cut from the sheet of Example 1 was placed between two 0.32 cm diameter cylindrical contacts connected to the output of a Hewlett Packard Model 6247B 0–60 V DC power supply. The circuit design was such that any current flow would have to pass through the thickness of the disc, i.e., the disc was positioned to be an element in the circuit. At a fixed potential of 2 volts, no current flowed through the circuit. A weight (1.5 kg) was then applied to the top of one of the contacts so that a force was exerted on the surface of the disc. The resistance measured through the disc dropped to less than 1 ohm and a preset current of 200 milliamps flowed through the circuit. When the weight was removed, the resistance increased and the flow of electrical current stopped. The same flow-no flow response was obtained by using the action of a fingertip pushing on the contact in place of the weight to cause the drop in resistance within the disc and allow for the flow of electrical current in the circuit. When the fingertip was lifted, the flow of current stopped.

Example 3

This example describes the preparation of a composite article of the invention using a conductive glass bead having both a different diameter and a different amount of metal coated thereon.

A precursor composite sheetlike article was prepared according to the method of Example 1 in which 30.0 g S5000-S2 silver coated glass beads (Potter Ind.) and 3.0 g Expancel 551DU polymeric microspheres (Nobel Ind.) were mixed with a dispersion of 5.35 g Teflon 30B (62% solids) (E.I. Dupont de Nemours, Inc.). The sheet contained 82.6% conductive particle, 8.3% energy expandable particle, and 9.1% PTFE. The thickness of the precursor composite sheet was 0.20 cm. After heating for 2 minutes at 120° C. to obtain an article of the invention, the final thickness was 0.23 cm. The resistance through the thickness was greater than 10 Megohms.

Example 4

This example describes the preparation of a composite article of the invention and its resilient character.

A precursor composite sheetlike article was prepared according to the method of Example 1 in which 24.0 g S3000-S silver coated glass beads (Potter Industries) and 1.0 g Expancel 551DU polymeric microspheres (Nobel Ind.) were mixed with a dispersion of 4.71 g Teflon 30B (62% solids) (E.I. Dupont de Nemours). The sheet contained 86.0% conductive particle, 3.6% energy expandable particle, and 10.4% PTFE by weight. The thickness of the precursor composite sheet was 0.030 cm. The resistance through the thickness was ca. 0.1 ohm. After heating a sample of the sheet for one minute at 120° C. to obtain an article of the invention, the thickness had increased to 0.051 cm and the resistance had increased to greater than $10^7$ ohms. When force was applied to the surface of the energy expanded article in the form of a 1.5 kg weight, the resistance dropped to less than one ohm. After removing the weight, the resistance increased to greater than $10^7$. This cycle was repeated several times with only a slight hysteresis loss at the high end suggesting that some permanent deformation may be occurring.

Example 5

This example describes the preparation and electrical properties of a composite article of the invention containing carbon as a conductive particle.

A sheetlike article of the invention was prepared according to the method of Example 1 in which 8.5 g M30 carbon spheres (Spectracorp, Lawrence, Mass.), 1.5 g Expancel 551DU polymeric microspheres (Potter Ind.), and 1.9 g Teflon 30B (60% solids) (E.I. Dupont de Nemours, Inc.) were combined. These values correspond to 76.3%, 13.5%, and 10.2% by weight, respectively. The final sheet had a thickness of 0.023 cm and a resistance of several Megohms. When a 1.5 kg weight was applied to the surface, the resistance decreased to several kiloohms. Removal of the weight caused the resistance to increase.

Example 6

This example describes addition of a nonconductive adjuvant to the composite article of the invention.

The method of Example 1 was used to prepare a sheetlike article containing 20 g S5000-S2 silver coated glass beads (Potter Ind.), 4.9 g Davisil silica, 4–20 micrometer (Aldrich Chemical, Milwaukee, Wis.), 0.1 g Expancel 551DU polymeric microspheres (Nobel Ind.), and 4.73 g Teflon 30B (62% solids) (E.I. Dupont de Nemours, Inc.). The weight percents of the components were 71.5, 17.6, 0.4, and 10.5, respectively. The membrane thickness was 0.25 cm before heating and increased to 0.27 cm after heating for 3 minutes at ca. 120° C. The resistance of the composite article of the invention was greater than 10 Megohms. When subjected to an external 1.5 kg force applied to the surface, the resistance decreased by several orders of magnitude. The drop was not as great as with other samples but this was assumed to be due to the larger bulk resistance of the precursor composite membrane as a result of having the nonconductive silica present.

Various modifications and alterations of this invention will become apparent to those skilled in the art without departing from the scope and spirit of this invention, and it should be understood that this invention is not to be unduly limited to the illustrative embodiments set forth herein.

We claim:

1. An electrically nonconductive composite article comprising a polytetrafluoroethylene fibril matrix having enmeshed therein
  (a) electrically conductive metal-containing particles, and
  (b) electrically nonconductive, energy expanded hollow polymeric particles.

2. The composite article according to claim 1 wherein the weight ratio of conductive particles to nonconductive particles is in the range of 999:1 to 3:1.

3. The composite article according to claim 1 wherein the weight ratio of total particles to fibril matrix is in the range of 98:2 to 75:25.

4. The composite article according to claim 1 wherein said conductive particles are metal particles or metal coated particles.

5. The composite article according to claim 4 wherein said metal or metal coated particles are powder, flakes, bubbles, or beads.

6. The composite article according to claim 1 wherein said conductive particles have a size in the range of 0.1 to 600 micrometers.

7. The composite article according to claim 1 wherein said conductive particles have a resistivity of less than 10 ohm-cm.

8. The composite article according to claim 1 wherein said nonconductive expanded particles have a polymeric shell and a liquid or gaseous core.

9. The composite article according to claim 8 wherein said nonconductive expanded particles have shells comprising copolymers selected from the group consisting of vinyl chloride and vinylidene chloride, vinyl chloride and acrylonitrile, vinylidene chloride and acrylonitrile, styrene and acrylonitrile, methyl methacrylate and styrene, methyl methacrylate and ethyl methacrylate, methacrylonitrile and acrylonitrile, and methyl methacrylate and orthochlorostyrene.

10. The composite article according to claim 1 wherein said expanded particles have a size in the range of 0.12 micrometer to 1000 micrometers.

11. The composite article according to claim 8 wherein said shell of said nonconductive expanded particles is poly(vinylidene chloride-co-acrylonitrile).

12. The composite article according to claim 8 wherein said shell of said nonconductive expanded particles is poly(methacrylonitrile-co-acrylonitrile).

13. The composite article according to claim 1 which is a membrane having a thickness in the range of 0.010 cm to 1.5 cm.

14. A pressure sensitive element comprising a polytetrafluoroethylene fibril matrix, having enmeshed therein
   a) electrically conductive particles, and
   b) electrically nonconductive, energy expanded hollow polymeric particles.

15. The element according to claim 14 wherein said electrically conductive particles are selected from the group consisting of carbon, metal, and particles coated with at least one of carbon and metal.

16. A method comprising the steps of:
   a) providing an electrically nonconductive element comprising a polytetrafluoroethylene fibril matrix having enmeshed therein
      1) electrically conductive particles, and
      2) electrically nonconductive, energy expanded hollow polymeric particles, and
   b) applying external pressure to said element while said element is subject to an electrical potential so as to effect a decrease in electrical resistance of at least a portion of said electrically nonconductive element to allow for the flow of electrical current.

17. The method according to claim 16 wherein said electrically conductive particles are carbon or metal, or particles coated with at least one of carbon and metal.

18. The method according to claim 16 wherein said electrically conductive particles are silver coated particles.

19. The method according to claim 16 wherein said external pressure is fingertip pressure.

20. The method according to claim 16 further comprising the step of
   removing said external pressure so as to effect an increase in electrical resistance and cause the electrical current to cease flowing.

21. The method according to claim 16 wherein said external pressure is applied to said element at more than one location.

* * * * *